United States Patent
Chen et al.

(10) Patent No.: US 10,686,607 B2
(45) Date of Patent: Jun. 16, 2020

(54) DATA STORAGE DEVICES AND METHODS FOR ENCRYPTING AND DECRYPTING A FIRMWARE FILE THEREOF

(71) Applicant: Silicon Motion, Inc., Jhubei (TW)

(72) Inventors: Ching-Ke Chen, Zhubei (TW); Yu-Han Hsiao, Shetou Township (TW)

(73) Assignee: Silicon Motion, Inc., Jhubei (TW)

( * ) Notice: Subject to any disclaimer, the term of this patent is extended or adjusted under 35 U.S.C. 154(b) by 335 days.

(21) Appl. No.: 15/853,247

(22) Filed: Dec. 22, 2017

(65) Prior Publication Data
US 2018/0351749 A1 Dec. 6, 2018

(30) Foreign Application Priority Data
Jun. 1, 2017 (TW) .............................. 106118074 A (51) Int. Cl.
*H04L 9/32* (2006.01)
*H04L 9/14* (2006.01)
*H04L 9/08* (2006.01)
*G06F 3/06* (2006.01)
*G06F 21/62* (2013.01)
*G06F 21/57* (2013.01)
*H04L 9/06* (2006.01)

(52) U.S. Cl.
CPC ............ *H04L 9/3247* (2013.01); *G06F 3/065* (2013.01); *G06F 3/0619* (2013.01); *G06F 3/0679* (2013.01); *G06F 21/572* (2013.01); *G06F 21/6218* (2013.01); *H04L 9/0861* (2013.01); *H04L 9/14* (2013.01); *G06F 2221/2107* (2013.01); *H04L 9/0631* (2013.01)

(58) Field of Classification Search
CPC .... G06F 21/572; G06F 3/065; G06F 21/6218; G06F 2221/2107; G06F 3/0679; G06F 3/0619; H04L 9/0631; H04L 9/0861; H04L 9/14; H04L 9/3247
See application file for complete search history.

(56) References Cited

U.S. PATENT DOCUMENTS

| | | | | |
|---|---|---|---|---|
| 7,774,596 | B2 * | 8/2010 | Flynn ..................... | G06F 9/4406 713/1 |
| 2004/0034785 | A1 * | 2/2004 | Tai ......................... | G06F 21/572 713/189 |
| 2005/0154912 | A1 * | 7/2005 | Kim ........................ | G06F 21/72 726/26 |
| 2006/0143475 | A1 | 6/2006 | Herbert | |

(Continued)

FOREIGN PATENT DOCUMENTS

| | | |
|---|---|---|
| TW | 200822068 A | 5/2008 |
| TW | 201106198 A | 2/2011 |
| WO | 2011119985 A2 | 9/2011 |

*Primary Examiner* — Baotran N To
(74) *Attorney, Agent, or Firm* — Wang Law Firm, Inc.

(57) ABSTRACT

A data storage device including a non-volatile memory and a micro-controller is provided. The non-volatile memory stores a firmware file. The micro-controller is coupled to the non-volatile memory, and performs an encryption procedure on the firmware file. The encryption procedure includes: using a first key and a first algorithm to encrypt the firmware file to generate a signature, using the first key and a second algorithm to scramble the signature to generate a scrambled signature, and attaching the scrambled signature to the firmware file.

22 Claims, 8 Drawing Sheets

(56) References Cited

U.S. PATENT DOCUMENTS

| | | | | |
|---|---|---|---|---|
| 2008/0072068 A1* | 3/2008 | Wang | ................... | G06F 21/572 |
| | | | | 713/191 |
| 2011/0035602 A1* | 2/2011 | Meng | ................... | H04L 9/0662 |
| | | | | 713/193 |
| 2012/0079287 A1* | 3/2012 | Leclercq | ............... | G06F 21/575 |
| | | | | 713/192 |
| 2017/0180137 A1* | 6/2017 | Spanier | ................... | G06F 8/654 |
| 2019/0199735 A1* | 6/2019 | Gosla | ..................... | G06F 21/50 |

* cited by examiner

DATA STORAGE DEVICES AND METHODS FOR ENCRYPTING AND DECRYPTING A FIRMWARE FILE THEREOF

CROSS REFERENCE TO RELATED APPLICATIONS

This Application claims priority of Taiwan Application No. 106118074, filed on Jun. 1, 2017, the entirety of which is incorporated by reference herein.

BACKGROUND OF THE APPLICATION

Field of the Application

The application relates generally to encryption and decryption of a firmware file, and more particularly, to a two-phase encryption and decryption method capable of controlling whether or not to allow updates of a firmware file in a data storage device.

Description of the Related Art

Due to advancements in computer technology, various mass storage devices have been developed, wherein memory is the most widely used type of storage medium of all. Memory can be categorized into two major types based on physical characteristics: volatile memory and non-volatile memory. Volatile memory requires an active power source to function. When the power source goes off, the content of the volatile memory is lost. In contrast to the volatile memory, non-volatile memory can retain its content without power being applied and the content can be accessed with power applied.

Using flash memory as an example of non-volatile memory, it is commonly required for manufacturers to make memory products that are compatible with various specifications made by the vendors and various types of non-volatile memory. In order to do so, manufacturers may load the information of the compatible specifications and types of non-volatile memory into the firmware of the memory products. However, after shipment of the memory products, vendors or users may need to modify the compatible specifications or types of non-volatile memory by updating the firmware of the memory products. Therefore, it has become an important issue regarding how to verify the validities of firmware updates.

BRIEF SUMMARY OF THE APPLICATION

In order to solve the aforementioned problem, the present application proposes data storage devices and methods for data storage devices to encrypt and decrypt firmware, which use a two-phase encryption and decryption mechanism to verify the validities of firmware updates, so that invalid firmware updates may be prevented.

In one aspect of the application, a data storage device comprising a non-volatile memory and a micro-controller is provided. The non-volatile memory stores a firmware file. The micro-controller is coupled to the non-volatile memory, and performs an encryption procedure on the firmware file. The encryption procedure comprises: using a first key and a first algorithm to encrypt the firmware file to generate a signature, using the first key and a second algorithm to scramble the signature to generate a scrambled signature, and attaching the scrambled signature to the firmware file.

In one embodiment, the data storage device further comprises an electronic fuse, and the encryption procedure further comprises: using a second key and the second algorithm to scramble the first key to generate a scrambled key, and writing the scrambled key to the electronic fuse.

In another aspect of the application, an encryption method, executed by a data storage device to encrypt a firmware file therein, is provided. The encryption method comprises the steps of: using a first key and a first algorithm to encrypt the firmware file to generate a signature; using the first key and a second algorithm to scramble the signature to generate a scrambled signature; and attaching the scrambled signature to the firmware file.

In one embodiment, the encryption method further comprises the steps of: using a second key and the second algorithm to scramble the first key to generate a scrambled key; and writing the scrambled key to an electronic fuse in the data storage device.

In preferred embodiments of the foregoing two aspects of the application, the first key is obtained from a user input, and the firmware file is stored in a non-volatile memory of the data storage device. Also, the scrambled signature is attached to an end or a header of the firmware file, the first algorithm is a Secure Hash Algorithm-256 (SHA-256), and the second algorithm is a Cyclic Redundancy Check-30 (CRC-30).

In yet another aspect of the application, a data storage device comprising a non-volatile memory, an electronic fuse, and a micro-controller is provided. The non-volatile memory stores a firmware file comprising a firmware program file and a first scrambled signature. The electronic fuse selectively stores or does not store a scrambled key. The micro-controller is coupled to the non-volatile memory and the electronic fuse, and performs a decryption procedure on the firmware file. The decryption procedure comprises: using a first key and a first algorithm to descramble the scrambled key to generate a second key, using the second key and a second algorithm to encrypt the firmware program file to generate a signature, using the second key and the first algorithm to scramble the signature to generate a second scrambled signature, and determining that the decryption procedure has successfully completed when the first scrambled signature and the second scrambled signature are the same.

In one embodiment, the decryption procedure further comprises: obtaining a third key from a user input, determining whether the third key and the second key are the same; when the third key and the second key are the same, performing the encryption of the firmware program file and the scrambling of the signature, and determining that the decryption procedure has successfully completed; and when the third key and the second key are not the same, determining that the decryption procedure has failed.

In another embodiment, the decryption procedure further comprises: determining that the decryption procedure has failed when the electronic fuse does not store the scrambled key.

In another aspect of the application, a decryption method, executed by a data storage device to decrypt a firmware file therein, is provided. The decryption method comprises the steps of: reading a scrambled key from an electronic fuse in the data storage device; using a first key and a first algorithm to descramble the scrambled key to generate a second key; using the second key and a second algorithm to encrypt the firmware program file to generate a signature; using the second key and the first algorithm to scramble the signature to generate a second scrambled signature; and determining that the decryption procedure has successfully completed when the first scrambled signature and the second scrambled signature are the same.

In one embodiment, the decryption method further comprises the steps of: obtaining a third key from a user input, determining whether the third key and the second key are the same; when the third key and the second key are the same, performing the encryption of the firmware program file and the scrambling of the signature, and determining that the decryption procedure has successfully completed; and when the third key and the second key are not the same, determining that the decryption procedure has failed.

In another embodiment, the decryption method further comprises the steps of: determining that the decryption procedure has failed when the electronic fuse does not store the scrambled key.

In preferred embodiments of the foregoing two aspects of the application, the first algorithm is a CRC-30, and the second algorithm is a SHA-256.

Other aspects and features of the application will become apparent to those with ordinary skill in the art upon review of the following descriptions of specific embodiments of the data storage devices and encryption and decryption methods for encrypting and decrypting a firmware file.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

There are various types of non-volatile memory, including flash memory, magneto-resistive Random Access Memory (RAM), ferroelectric RAM, resistive RAM, and Spin Transfer Torque (STT) RAM, etc., and all of them are capable of long-term data storage. The following description uses flash memory as an example for the purpose of illustration, but the present application should not be limited thereto.

In recent years, flash memory has been widely adopted as one of the major forms of storage media in data storage devices, such as memory cards, Universal Serial Bus (USB) flash drives, and Solid State Drives (SSDs). One of the applications of flash memory is to use the technique of Multi Chip Package (MCP) to incorporate a flash memory and its controller into a single chipset which may be referred to as an embedded MultiMedia Card (eMMC).

The data storage devices that use flash memory as a storage medium may be used in various types of electronic devices, including mobile phones, wearable devices, panel Personal Computers (PCs), and Virtual Reality (VR) equipment. The Central Processing Units (CPUs) in those electronic devices are generally considered as the hosts operating the data storage devices therein.

Figure 1:
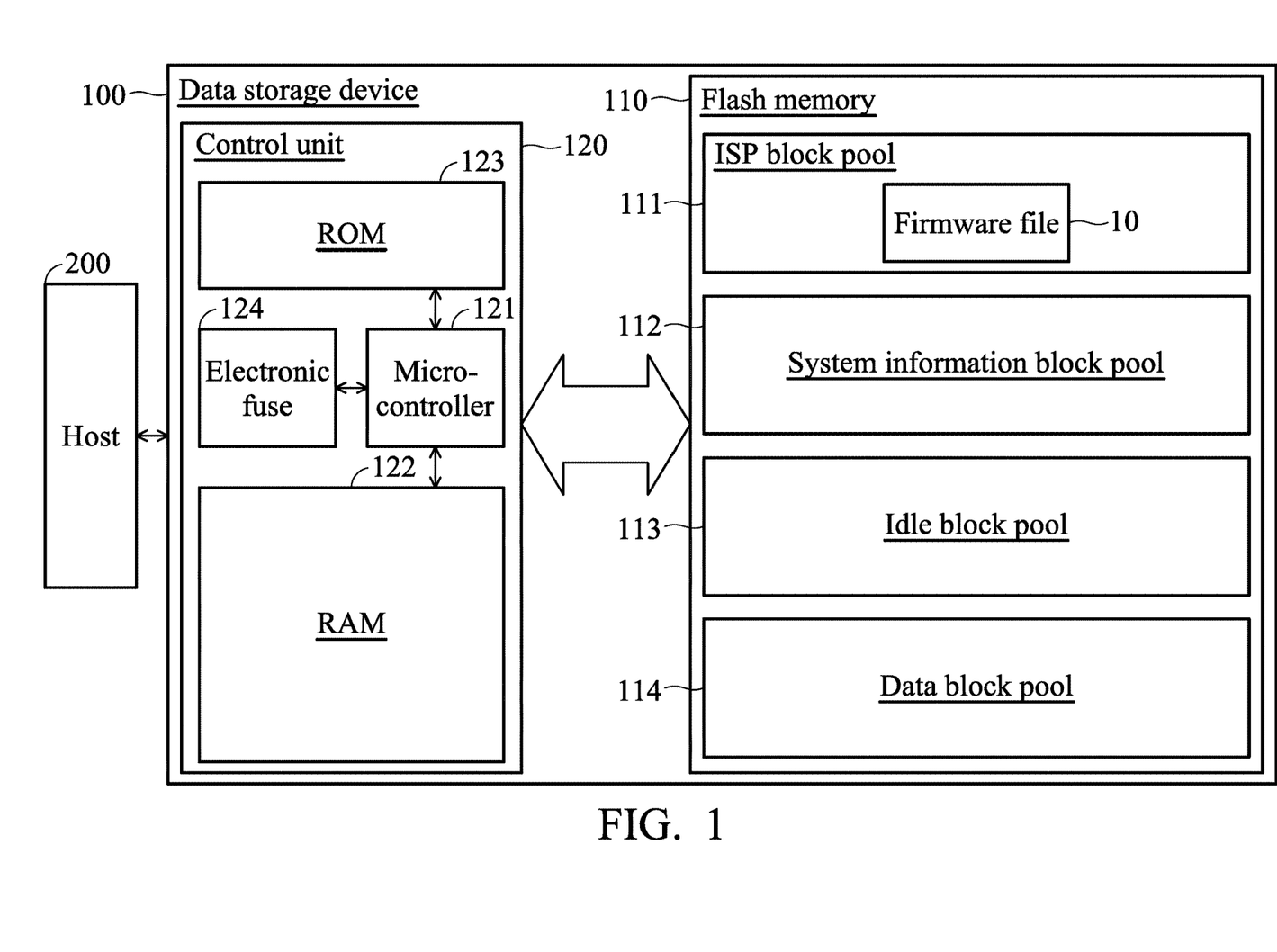
FIG. 1 is a block diagram illustrating a data storage device according to an embodiment of the present application.

FIG. 1 is a block diagram illustrating a data storage device according to an embodiment of the present application. The data storage device 100 includes a flash memory 110 and a control unit 120, wherein the control unit 120 is coupled between a host 200 and the flash memory 110, and operates the flash memory 110 according to the instructions (e.g., "read", "write", or "reset", etc.) issued by the host 200.

The control unit 120 includes a micro-controller 121, a RAM 122, a Read-Only Memory (ROM) 123, and an electronic fuse (also called an efuse) 124, wherein the micro-controller 121 and the RAM 122 may be packaged into a single die or may be disposed in separate dies. For example, if the data storage device 100 is a Secure Digital (SD) card, the RAM 122 may be a 512 KB Static RAM (SRAM).

The ROM 123 is used to store read-only program code (e.g., ROM code) which is loaded and executed by the micro-controller 121 to perform the encryption method and decryption method of the present application.

The electronic fuse 124 is a one-time programmable fuse that can only be programmed once to permanently store data, such as the scrambled key used in the encryption method and decryption method of the present application. Once the electronic fuse 124 is programmed, what is stored therein can only be read and is un-modifiable.

The micro-controller 121 may read the scrambled key from the electronic fuse 124, load and execute the read-only program code from the ROM 123, and load and execute the firmware file 10 stored in the In-System Programming (ISP) block pool 111 of the flash memory 110, to perform the encryption method and decryption method of the present application. The firmware file 10 may be the original firmware file pre-loaded by the manufacturer, or it may be an updated firmware file that is downloaded from the Internet by the user. The RAM 122 may serve as a dynamic data buffer during the operation of the micro-controller 121. In one embodiment, the firmware file 10 may contain a firmware program file ISP.bin, and other information, such as the built-in first scrambled signature $SCR\_S_{A1}$.

The flash memory 110 includes an ISP block pool 111, a system information block pool 112, an idle block pool 113, and a data block pool 114.

The blocks in the ISP block pool 111 are used to store ISP code which includes the firmware file 10.

The blocks in the system information block pool 112 are used to provide non-volatile storage of system information, including the Host-to-Flash (H2F) mapping table. The detailed description of the H2F mapping table will be addressed later.

The blocks in the idle block pool 113 are allocated by the micro-controller 121 to store data. For example, the blocks in the idle block pool 113 may be used to store the data written from the host 200, or may serve as destination blocks for the garbage collection process. Once a block in the idle block pool 113 is fully written or is terminated from any further data writing, it may be re-allocated as a data block in the data block pool 114.

Figure 2:
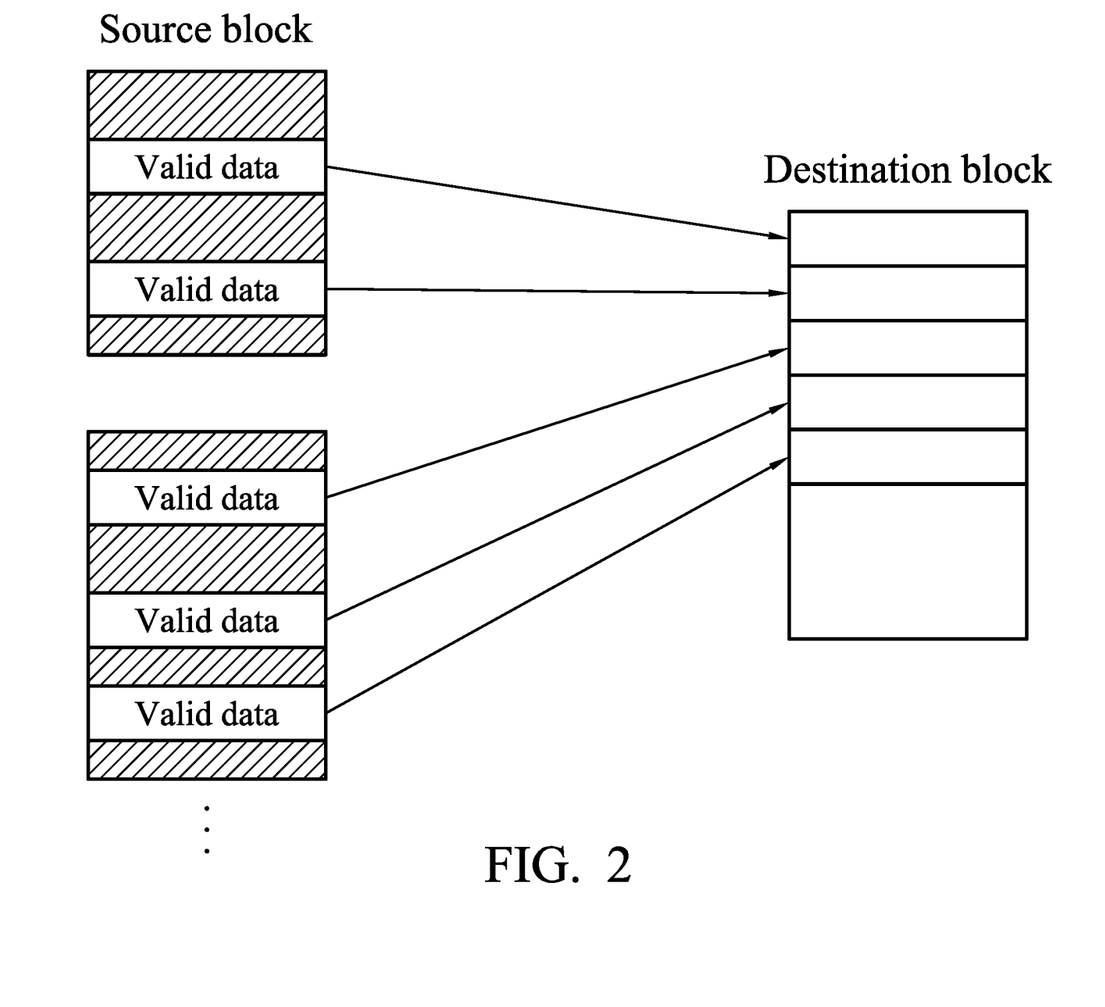
FIG. 2 is a schematic diagram illustrating the garbage collection process.

One of the physical characteristics of a flash memory is that the updates to the data stored therein are not carried out by updating the data in the same storage space. Instead, the update data is stored in the idle space, and the data in the original storage space will be configured as invalid. Due to this physical characteristic, frequent data writing inevitably causes a lot of invalid data throughout the flash memory. FIG. 2 is a schematic diagram illustrating the garbage collection process. As shown in FIG. 2, the spaces holding the invalid data are denoted with backgrounds filled with slashes, and the valid data in the source block is to be duplicated and written to the destination block. When all the valid data in the source block has been successfully duplicated and written to the destination block, the source block may be erased and configured as an idle block, i.e., the space of the source block will be released.

The blocks in the data block pool 114 may be referred to as data blocks, each of which provides a storage space defined by physical addresses, and the data blocks are where the data that the host 200 wishes to access is stored. In addition, a respective Flash-to-Host (F2H) mapping table is stored in the End of Block (EOB) of each data block, and preferably, the EOB refers to the last data page of each data block. The detailed description of the F2H mapping table will be addressed later.

Figure 3A:
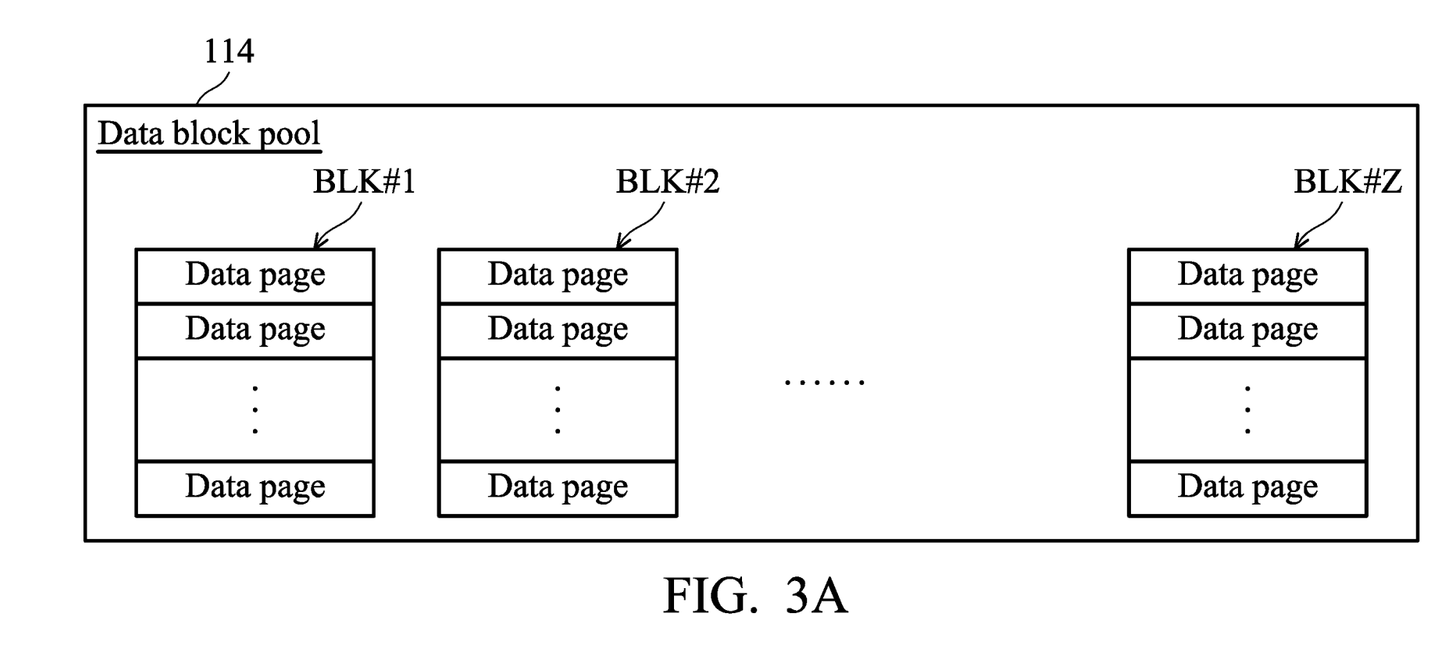
FIGS. 3A and 3B are schematic diagrams illustrating the data block pool 114.
Figure 3B:
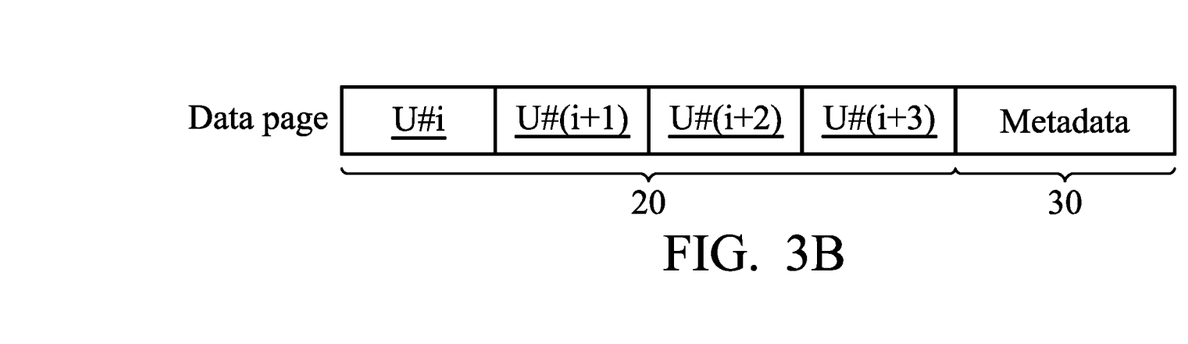

FIGS. 3A and 3B are schematic diagrams illustrating the data block pool 114.

As shown in FIG. 3A, the storage space in the data block pool 114 may be divided into a plurality of physical blocks BLK #1, BLK #2, . . . BLK # Z, wherein Z is a positive integer. Each physical block includes a plurality of physical pages (also called data pages). For example, there may be 256 data pages in each physical block.

As shown in FIG. 3B, each data page includes a data area 20 and a spare area 30. The data area 20 includes a plurality of storage units U # i, U #(i+1), U #(i+2), and U #(i+3), and after being allocated, each storage unit corresponds to one or more logical addresses used by the host 200. The logical addresses may be represented in various forms, such as Logical Block Addresses (LBAs) or indexed by Global Host Pages (GHPs).

In one embodiment, the size of the data area 20 is 16 Kilo-Byte (KB), and the size of each storage unit therein is 4 KB, wherein each storage unit corresponds to 8 logical addresses (e.g., LBA #0~LBA #7) or 1 GHP.

The spare area 30 stores metadata of the current data page, wherein the metadata includes a block identification and mapping information. The block identification stores the identification of the physical block to which the current data page belongs. The mapping information indicates the logical addresses corresponding to the storage units U # i, U #(i+1), U #(i+2), and U #(i+3). For example, the mapping information may include 4 sections of LBAs (each section contains 8 LBAs), or indices of 4 GHPs. The following description is made using the GHP indices as an example for the purpose of illustration, and the present application should not be limited thereto.

During the operation of the data storage device 100, the mapping information of the flash memory 110 is managed dynamically as memory address mapping tables, including the H2F mapping table and the F2H mapping tables. The entries in the H2F mapping table may be indexed by GHPs and store the information indicating the physical addresses to which the data of the GHPs is stored. That is, each physical address specifies a data page in a data block and/or a storage unit in the data page. The entries in the F2H mapping table store the information indicating the GHPs corresponding to the data in the data pages or storage units. Thus, the memory address mapping tables are important references for the operation of the data storage device 100.

Figure 4A:
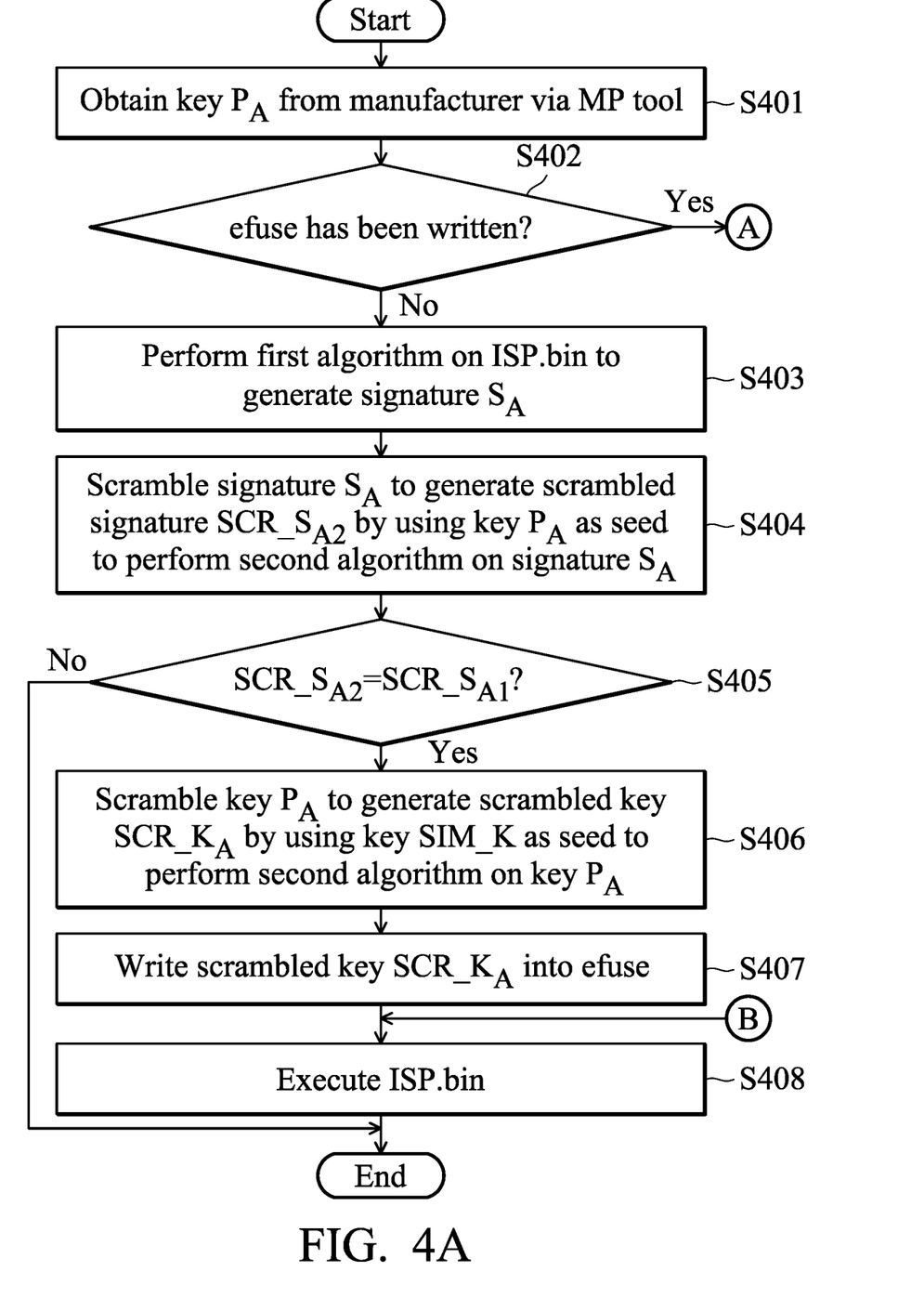
FIGS. 4A and 4B show a flow chart illustrating an open-card process with a verification mechanism according to an embodiment of the present application.
Figure 4B:
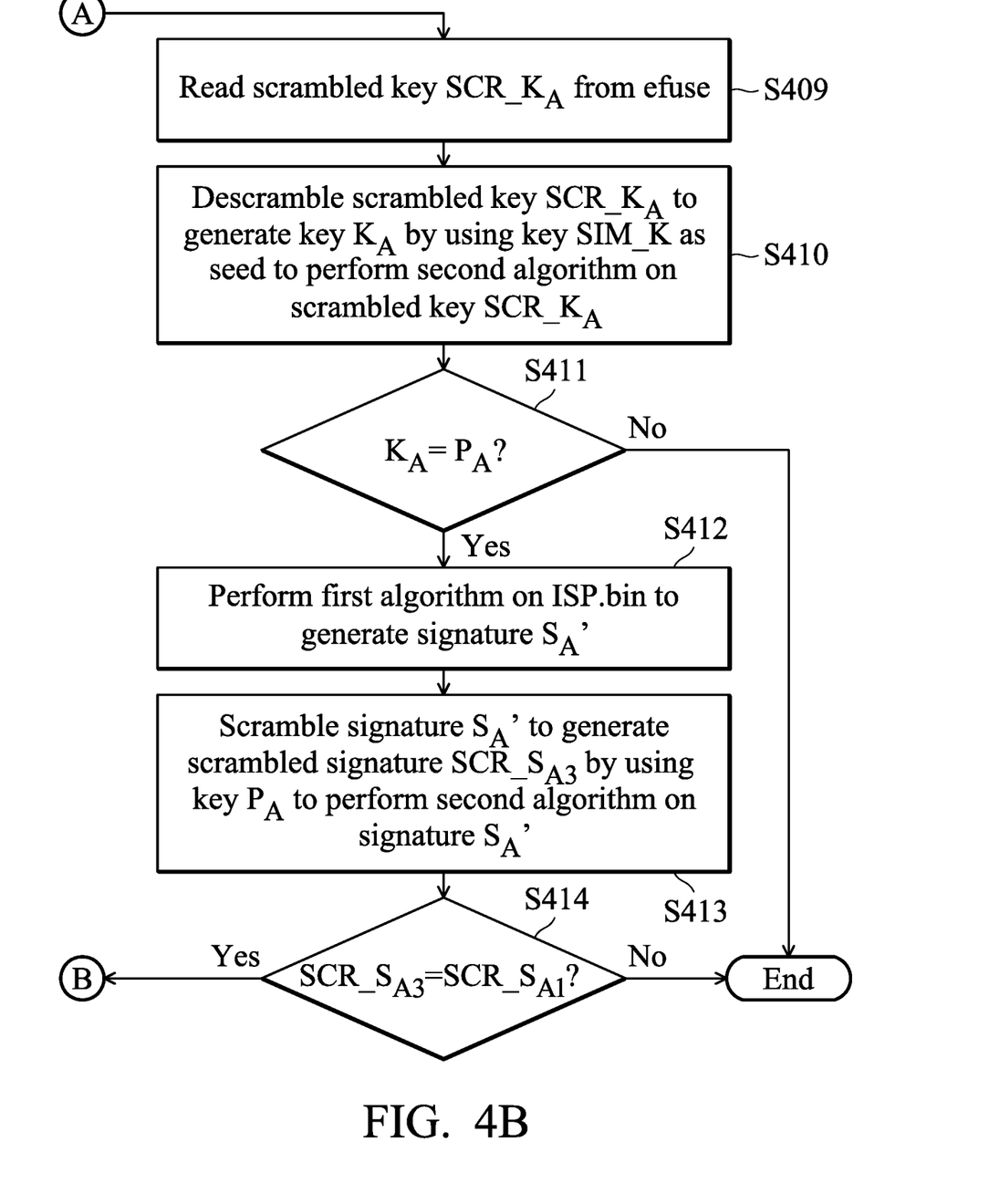

FIGS. 4A and 4B show a flow chart illustrating an open-card process with a verification mechanism according to an embodiment of the present application. In this embodiment, the validity of the firmware file is verified before executing the firmware file, so as to prevent unexpected damage caused by the installation of an unauthorized firmware file in the data storage device 100. In addition, the open-card process may be incorporated into the Mass Production (MP) process (i.e., the open-card process may be a part of the MP process).

To begin with, the manufacturer inputs a key $P_A$ to an MP tool, and the micro-controller 121 obtains the key $P_A$ via the MP tool (step S401), wherein the MP tool may be implemented by a software program.

Subsequently, the micro-controller 121 determines whether the electronic fuse 124 has been written (step S402). If the electronic fuse 124 hasn't been written, then this is the first time that the open-card process is performed on the data storage device 100, and the micro-controller 121 performs the first phase of the verification mechanism, which includes reading the firmware file 10 from the ISP block pool 111 of the flash memory 110, and performing a first algorithm on the firmware program file ISP.bin to generate a signature $S_A$ (step S403).

In one embodiment, the first algorithm is the Secure Hash Algorithm-256 (SHA-256), and the signature $S_A$ is a 32-byte signature.

Subsequent to step S403, the micro-controller 121 performs the second phase of the verification mechanism, which includes scrambling the signature $S_A$ to generate a second scrambled signature $SCR\_S_{A2}$ by using the key $P_A$ as the seed to perform a second algorithm on the signature $S_A$ (step S404).

In one embodiment, the second algorithm is the Cyclic Redundancy Check-30 (CRC-30), and it is reversible. That is, using the same seed to perform the second algorithm on the second scrambled signature $SCR\_S_{A2}$ (i.e., descrambling the second scrambled signature $SCR\_S_{A2}$) may generate the signature $S_A$.

Subsequent to step S404, the micro-controller 121 determines whether the second scrambled signature $SCR\_S_{A2}$ and the first scrambled signature $SCR\_S_{A1}$ in the firmware file 10 are the same (step S405). Specifically, the micro-controller 121 compares the second scrambled signature $SCR\_S_{A2}$ with the first scrambled signature $SCR\_S_{A1}$ in the firmware file 10, and if they are the same, the method proceeds to step S406; otherwise, if they are not the same, then the open-card process is terminated and the method ends.

Figure 5:
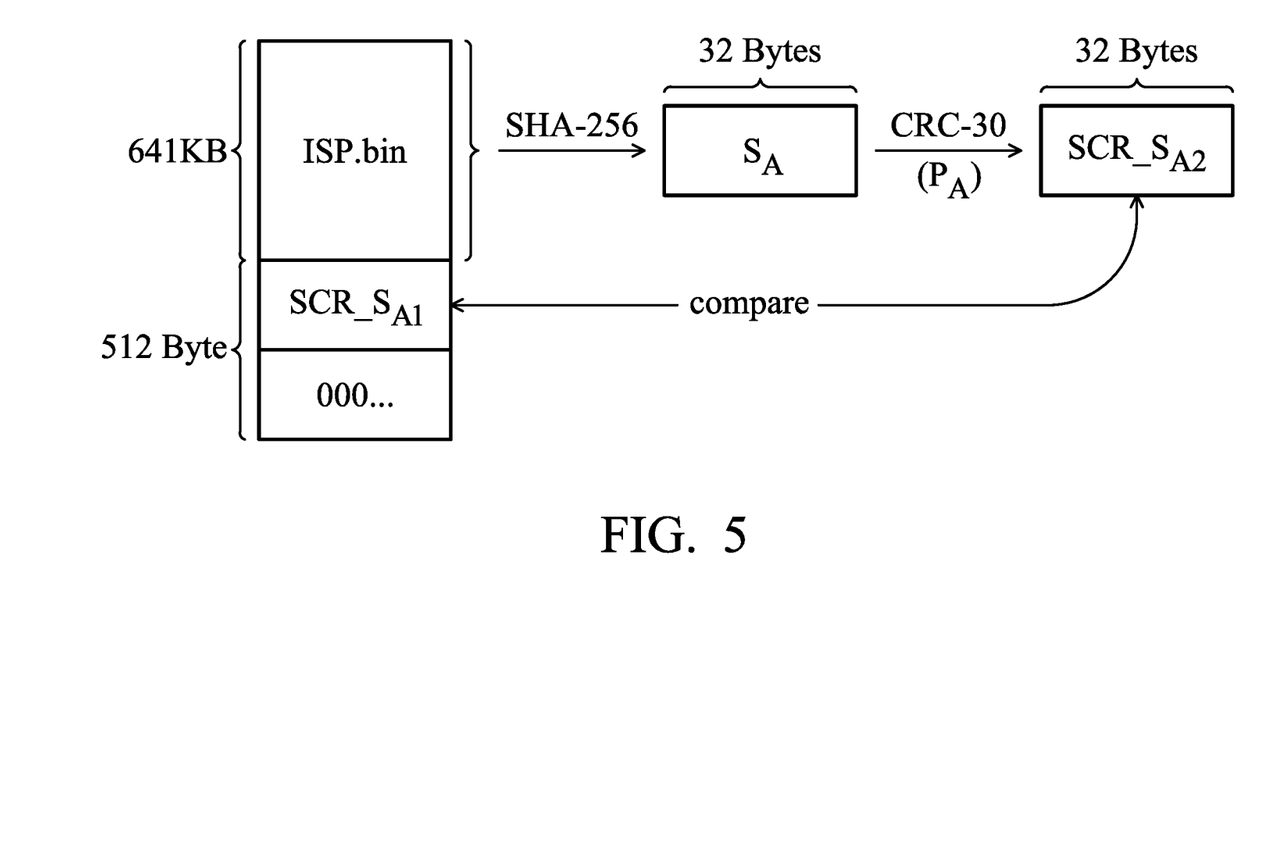
FIG. 5 is a schematic diagram illustrating a firmware file according to an embodiment of the present application.

FIG. 5 is a schematic diagram illustrating a firmware file according to an embodiment of the present application. As shown in FIG. 5, the firmware file contains a firmware program file ISP.bin and a first scrambled signature $SCR\_S_{A1}$, wherein the size of the firmware program file ISP.bin is 641 KB, and the first scrambled signature $SCR\_S_{A1}$ may be attached to the end or header of the firmware program file ISP.bin. For example, the first scrambled signature $SCR\_S_{A1}$ may be attached to the end of the firmware program file ISP.bin and then padded with zeros until the first scrambled signature $SCR\_S_{A1}$ and the paddings are 512 KB long in total. First of all, step S403 is performed on the firmware program file ISP.bin to generate a signature $S_A$, and then step S404 is performed on the signature $S_A$ to generate a scrambled signature SCR_$S_{A2}$. After that, step S405 is performed to see if the scrambled signatures SCR_$S_{A2}$ and SCR_$S_{A1}$ are the same.

Referring back to FIG. 4A, subsequent to step S405, if the second scrambled signature SCR_$S_{A2}$ and the first scrambled signature SCR_$S_{A1}$ are the same, the micro-controller 121 scrambles the key $P_A$ to generate a scrambled key SCR_$K_A$ by using the key SIM_K as the seed to perform the second algorithm on the key $P_A$ (step S406), so as to prevent the key $P_A$ from becoming compromised. Next, the micro-controller 121 writes the scrambled key SCR_$K_A$ into the electronic fuse 124 (step S407).

In one embodiment, the key SIM_K is a key with a fixed length, which may be predetermined by the firmware file.

Subsequent to step S407, the micro-controller 121 executes the firmware program file ISP.bin (step S408), and the method ends. Detailed description of the execution of the firmware program file ISP.bin and the follow-ups of the open-card process is omitted herein, since they are beyond the scope of the present application.

Subsequent to step S402, if the electronic fuse 124 has been written, then it means that this is an attempt to re-open the data storage device 100 (i.e., steps S403 to S408 have been performed some time before), and the electronic fuse 124 has already stored a scrambled key SCR_$K_A$.

In response to the electronic fuse 124 having been written, the micro-controller 121 reads the scrambled key SCR_$K_A$ from the electronic fuse 124 (step S409), and then descrambles the scrambled key SCR_$K_A$ to generate a key $K_A$ by using the key SIM_K as the seed to perform the second algorithm on the scrambled key SCR_$K_A$ (step S410).

Next, the micro-controller 121 determines whether the key $K_A$ and the key $P_A$ are the same (step S411). If the key $K_A$ and the key $P_A$ are not the same, then it means that the key $P_A$ is an invalid or unauthorized key, and the method ends. Otherwise, if the key $K_A$ and the key $P_A$ are the same, then it means that the key $P_A$ is a valid or authorized key, so the micro-controller 121 reads the firmware file 10 from the ISP block pool 111 of the flash memory 110 and performs the first algorithm on the firmware program file ISP.bin of the firmware file 10 to generate a signature $S_A'$ (step S412).

After that, the micro-controller 121 scrambles the signature $S_A'$ to generate a third scrambled signature SCR_$S_{A3}$ by using the key $P_A$ to perform the second algorithm on the signature $S_A'$ (step S413), and then determines whether the third scrambled signature SCR_$S_{A3}$ and the first scrambled signature SCR_$S_{A1}$ in the firmware file 10 are the same (step S414). If the third scrambled signature SCR_$S_{A3}$ and the first scrambled signature SCR_$S_{A1}$ are the same, then it means that the firmware file 10 is valid or authorized, and the method proceeds to step S408. Otherwise, if the third scrambled signature SCR_$S_{A3}$ and the first scrambled signature SCR_$S_{A1}$ are not the same, then it means that the firmware file 10 is invalid or unauthorized, and the open-card process is terminated and the method ends.

Figure 6:
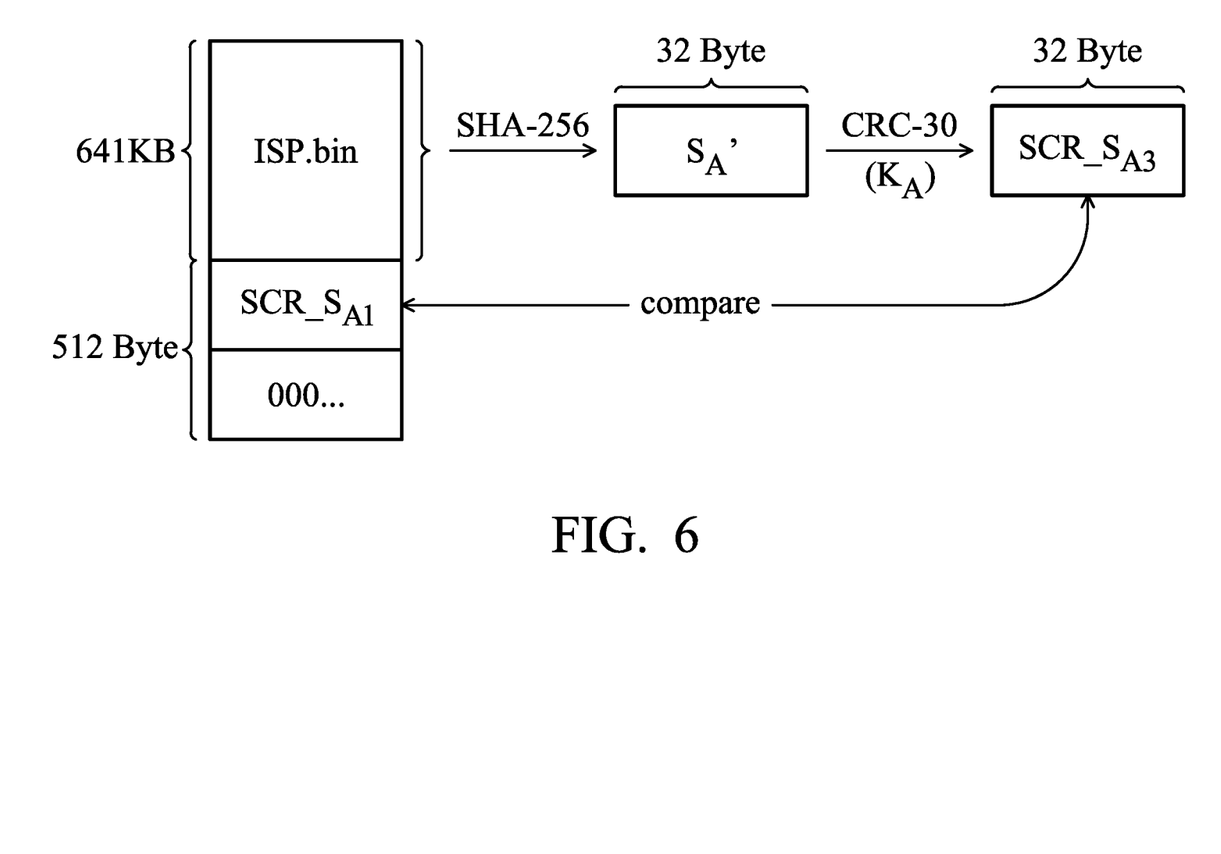
FIG. 6 is a schematic diagram illustrating a firmware file according to another embodiment of the present application.

FIG. 6 is a schematic diagram illustrating a firmware file according to another embodiment of the present application. As shown in FIG. 6, the firmware file contains a firmware program file ISP.bin and a scrambled signature SCR_$S_{A1}$. First of all, step S412 is performed on the firmware program file ISP.bin to generate a signature $S_A'$, and then step S413 is performed on the signature $S_A'$ to generate a scrambled signature SCR_$S_{A3}$. After that, step S414 is performed to see if the scrambled signatures SCR_$S_{A3}$ and SCR_$S_{A1}$ are the same.

Figure 7:
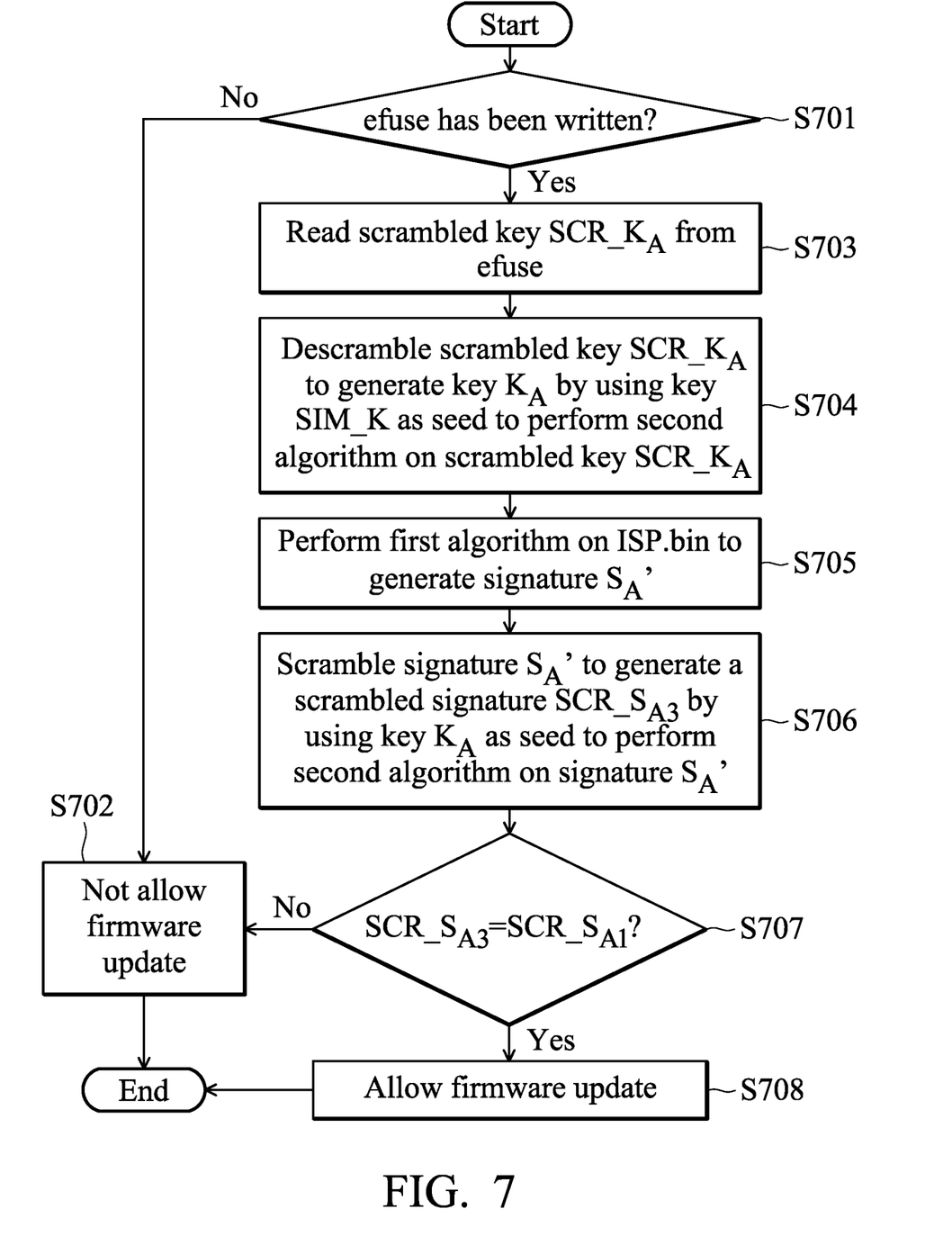
FIG. 7 is a flow chart illustrating a firmware update process with a verification mechanism according to an embodiment of the present application.

FIG. 7 is a flow chart illustrating a firmware update process with a verification mechanism according to an embodiment of the present application. In this embodiment, the firmware update process is capable of managing whether the user is allowed to update the firmware file of the data storage device 100.

To begin with, the micro-controller 121 determines whether the electronic fuse 124 has been written (step S701), and if not, it means that this is an abnormal situation and it is not allowed to update the firmware file of the data storage device 100 (step S702), and the method ends. Otherwise, if the electronic fuse 124 has been written, the micro-controller 121 reads a scrambled key SCR_$K_A$ from the electronic fuse 124 (step S703), and then descrambles the scrambled key SCR_$K_A$ to generate a key $K_A$ by using the key SIM_K as the seed to perform a second algorithm on the scrambled key SCR_$K_A$ (step S704).

In one embodiment, the second algorithm is the CRC-30 and it is reversible. That is, using the same seed (i.e., key SIM_K) to perform the second algorithm on the scrambled data (i.e., descrambling the scrambled data) may generate the original data (i.e., unscrambled data).

Subsequently, the micro-controller 121 reads the firmware file 10 from the ISP block pool 111 of the flash memory 110, and performs a first algorithm on the firmware program file ISP.bin in the firmware file 10 to generate a signature $S_A'$ (step S705).

In one embodiment, the first algorithm is the SHA-256, and the signature $S_A'$ is a 32-byte signature.

After that, the micro-controller 121 scrambles the signature $S_A'$ to generate a scrambled signature SCR_$S_{A3}$ by using the key $K_A$ as the seed to perform the second algorithm on the signature $S_A'$ (step S706), and then it determines whether the scrambled signature SCR_$S_{A3}$ and the scrambled signature SCR_$S_{A1}$ in the firmware file 10 are the same (step S707). If the scrambled signature SCR_$S_{A3}$ and the scrambled signature SCR_$S_{A1}$ are not the same, then it means that the decryption has failed, and the method proceeds to step S703. Otherwise, if the scrambled signature SCR_$S_{A3}$ and the scrambled signature SCR_$S_{A1}$ are the same, then it means that the firmware file 10 is valid or authorized, and it is allowed to update the firmware file 10 (step S708), and the method ends. Detailed description of the update of the firmware file is omitted herein, since they are beyond the scope of the present application.

In view of the forgoing embodiments of FIGS. 4-7, it will be appreciated that the present application realizes control over firmware updates by applying a two-phase encryption and decryption method to verify the validities of firmware updates. In addition, the key used in the two-phase encryption and decryption method is further scrambled and stored in an electronic fuse to prevent the key from becoming compromised. Advantageously, the two-phase encryption and decryption method improves the security of firmware updates.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

What is claimed is:

1. A data storage device, comprising:
an electronic fuse;
a non-volatile memory, storing a firmware file; and a micro-controller, coupled to the non-volatile memory, performing an encryption procedure on the firmware file, wherein the encryption procedure comprises: using a first key and a first algorithm to encrypt the firmware file to generate a signature, using the first key and a second algorithm to scramble the signature to generate a scrambled signature, and attaching the scrambled signature to the firmware file;

wherein the encryption procedure further comprises: using a second key and the second algorithm to scramble the first key to generate a scrambled key, and writing the scrambled key to the electronic fuse.

2. The data storage device as claimed in claim 1, wherein the first key is obtained from a user input.

3. The data storage device as claimed in claim 1, wherein the first algorithm is a Secure Hash Algorithm-256 (SHA-256), and the second algorithm is a Cyclic Redundancy Check-30 (CRC-30).

4. The data storage device as claimed in claim 1, wherein the scrambled signature is attached to an end or a header of the firmware file.

5. An encryption method, executed by a micro-controller coupled to a non-volatile memory, comprising:

using a first key and a first algorithm to encrypt a firmware file stored in the non-volatile memory to generate a signature;

using the first key and a second algorithm to scramble the signature to generate a scrambled signature;

attaching the scrambled signature to the firmware file;

using a second key and the second algorithm to scramble the first key to generate a scrambled key; and writing the scrambled key to an electronic fuse.

6. The encryption method as claimed in claim 5, wherein the first key is obtained from a user input, and the firmware file is stored in the non-volatile memory.

7. The encryption method as claimed in claim 5, wherein the first algorithm is a Secure Hash Algorithm-256 (SHA-256), and the second algorithm is a Cyclic Redundancy Check-30 (CRC-30).

8. The encryption method as claimed in claim 5, wherein the scrambled signature is attached to an end or a header of the firmware file.

9. A data storage device, comprising:

a non-volatile memory, storing a firmware file comprising a firmware program file and a first scrambled signature;

an electronic fuse, selectively storing or not storing a scrambled key; and a micro-controller, coupled to the non-volatile memory and the electronic fuse, performing a decryption procedure on the firmware file, wherein the decryption procedure comprises: using a first key and a first algorithm to descramble the scrambled key to generate a second key, using the second key and a second algorithm to encrypt the firmware program file to generate a signature, using the second key and the first algorithm to scramble the signature to generate a second scrambled signature, and determining that the decryption procedure has successfully completed when the first scrambled signature and the second scrambled signature are match.

10. The data storage device as claimed in claim 9, wherein the decryption procedure further comprises:

obtaining a third key from a user input, determining whether the third key and the second key are match;

when the third key and the second key are match, performing the encryption of the firmware program file and the scrambling of the signature, and determining that the decryption procedure has successfully completed; and when the third key and the second key are not match, determining that the decryption procedure has failed.

11. The data storage device as claimed in claim 9, wherein the decryption procedure further comprises: determining that the decryption procedure has failed when the electronic fuse does not store the scrambled key.

12. The data storage device as claimed in claim 9, wherein the first algorithm is a Cyclic Redundancy Check-30 (CRC-30), and the second algorithm is a Secure Hash Algorithm-256 (SHA-256).

13. A decryption method, executed by a micro-controller coupled to a non-volatile memory which stores a firmware file, comprising:

reading a scrambled key from an electronic fuse;

using a first key and a first algorithm to descramble the scrambled key to generate a second key;

using the second key and a second algorithm to encrypt the firmware program file to generate a signature;

using the second key and the first algorithm to scramble the signature to generate a second scrambled signature; and determining that the decryption procedure has successfully completed when the first scrambled signature and the second scrambled signature are match.

14. The decryption method as claimed in claim 13, further comprising:

obtaining a third key from a user input, determining whether the third key and the second key are match;

when the third key and the second key are match, performing the encryption of the firmware program file and the scrambling of the signature, and determining that the decryption procedure has successfully completed; and when the third key and the second key are not match, determining that the decryption procedure has failed.

15. The decryption method as claimed in claim 13, further comprising:

determining that the decryption procedure has failed when the electronic fuse does not store the scrambled key.

16. The decryption method as claimed in claim 13, wherein the first algorithm is a Cyclic Redundancy Check-30 (CRC-30), and the second algorithm is a Secure Hash Algorithm-256 (SHA-256).

17. A flash controller, coupled to a flash memory, comprising:

an electronic fuse; and a micro-controller, coupled to the electronic fuse, performing an encryption procedure or a decryption procedure on a firmware file stored in the flash memory, wherein the encryption procedure comprises: using a first key and a first algorithm to encrypt the firmware file to generate a first signature, using the first key and a second algorithm to scramble the first signature to generate a first scrambled signature, attaching the first scrambled signature to the firmware file, using a second key and the second algorithm to scramble the first key to generate a scrambled key, and writing the scrambled key to the electronic fuse;

wherein the decryption procedure comprises: using the second key and the second algorithm to descramble the scrambled key to generate the first key, using the first key and the first algorithm to encrypt the firmware program file to generate a second signature, using the first key and the second algorithm to scramble the second signature to generate a second scrambled signature, and determining that the decryption procedure has successfully completed when the first scrambled signature and the second scrambled signature are match.

18. The flash controller as claimed in claim 17, wherein the first key is obtained from a user input.

19. The flash controller as claimed in claim 17, wherein the first algorithm is a Secure Hash Algorithm-256 (SHA-256), and the second algorithm is a Cyclic Redundancy Check-30 (CRC-30).

20. The flash controller as claimed in claim 17, wherein the first scrambled signature is attached to an end or a header of the firmware file.

21. The flash controller as claimed in claim 17, wherein the decryption procedure further comprises:
   obtaining a third key from a user input, determining whether the third key and the second key are match;
   when the third key and the second key are match, performing the encryption of the firmware program file and the scrambling of the signature, and determining that the decryption procedure has successfully completed; and
   when the third key and the second key are not match, determining that the decryption procedure has failed.

22. The flash controller as claimed in claim 17, wherein the decryption procedure further comprises: determining that the decryption procedure has failed when the electronic fuse does not store the scrambled key.

* * * * *